United States Patent

[11] 3,605,011

[72] Inventors Clifton W. Hart
Mound;
Eugene E. Rosacker, Richfield, both of Minn.
[21] Appl. No. 643,299
[22] Filed May 25, 1967
[45] Patented Sept. 14, 1971
[73] Assignee Honeywell Inc.
Minneapolis, Minn.

[54] CONTROL APPARATUS
7 Claims, 1 Drawing Fig.
[52] U.S. Cl. ...................................... 324/43 R,
307/265, 307/273, 307/278
[51] Int. Cl. ........................................ G01r 33/02
[50] Field of Search .......................................... 307/88.5,
2.03, 2.21, 2.23, 10.60, 21.5, 23.1, 27; 332/12;
324/43; 331/145, 146, 181

[56] References Cited
UNITED STATES PATENTS
2,991,414  7/1961  Tillman ........................  324/43
*Primary Examiner*—Rodney D. Bennett, Jr.
*Assistant Examiner*—Daniel C. Kaufman
*Attorneys*—Roger W. Jensen, Charles J. Ungemach, Bruce C. Lutz and Albin Medved ABSTRACT: A pulse width modulated magnetometer utilizing a single winding and having solid-state feedback. The operation of the magnetometer lying in the method of passing current through the single winding only until its saturable core is saturated to produce a pulse width modulated output since the change in flux in the core between residual and saturated conditions is dependent upon ambient magnetic field conditions.

PATENTED SEP 14 1971
3,605,011
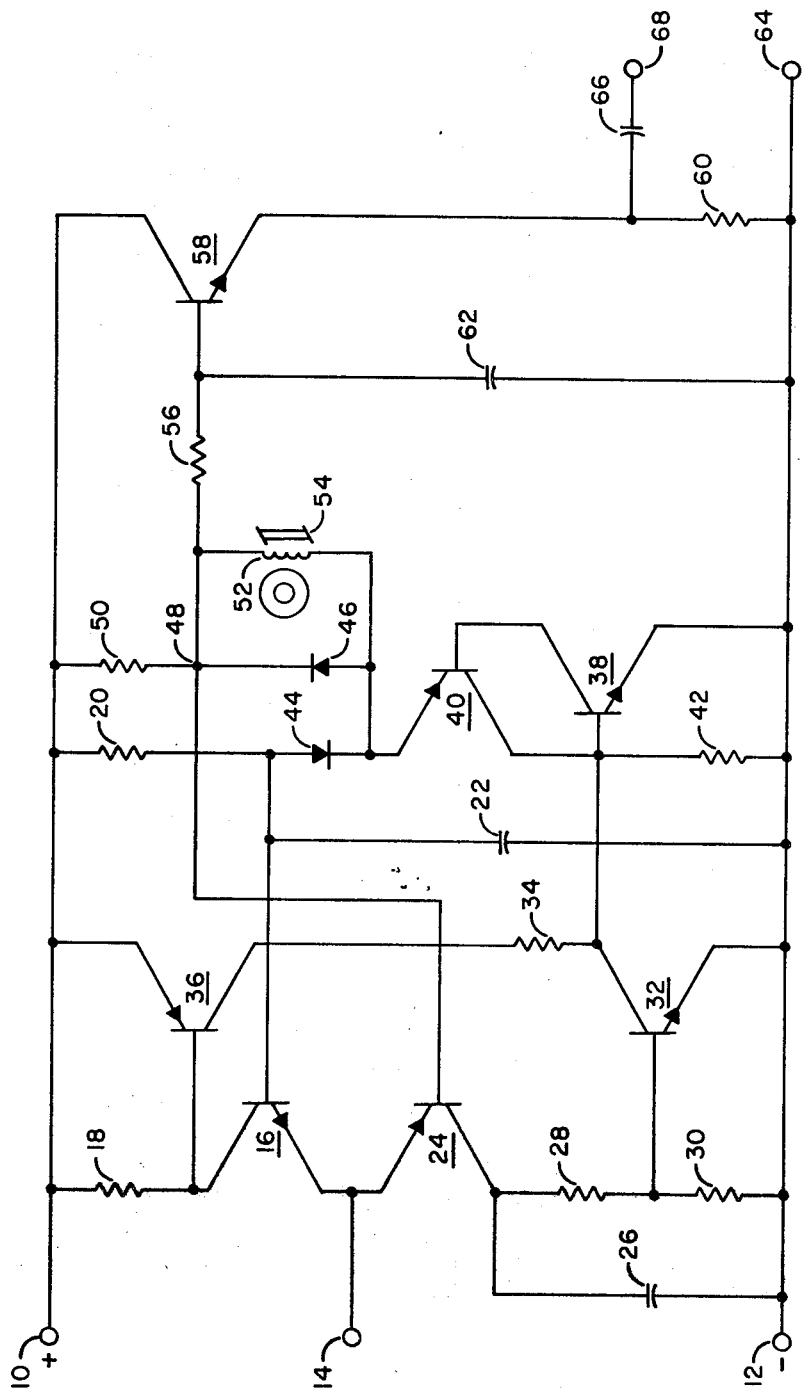
INVENTORS
CLIFTON W. HART
BY  EUGENE E. ROSACKER
*Bruce C Lutz*
ATTORNEY 3,605,011

CONTROL APPARATUS

THE INVENTION

This invention relates generally to magnetic field strength apparatus and more particularly to a pulse width modulated magnetometer utilizing a single winding on a toroidal core.

This invention is an improvement upon two previous applications which are copending in our names and were both filed on May 25, 1967 with the application Ser. No. 642,665 and 642,666 respectively and are assigned to the same assignee as the present invention.

The previously filed applications discuss respectively the general method of operation of unidirectionally saturating a core to provide an output indication of ambient magnetic field strength and the improvement thereupon of passing current through the sensing winding of the core for a period of time dependent upon the residual flux state of the core through the use of a feedback winding to turn a series switch OFF once the core saturates.

The present invention eliminates the feedback winding and thus produces a magnetometer which can be easily integrated into a single circuit chip with the exception of the core and the one winding. The elimination of one winding from a core substantially reduces the cost of making the core. The elimination of the step of connecting an additional winding to an integrated circuit even further reduces the cost of the entire unit. Therefore, the present invention while utilizing somewhat more components than the previous two inventions provides a method for measuring magnetic field strength while incorporating integrated circuit techniques and utilizing only a single winding to reduce the cost of the entire circuit considerably. Further, the present invention, since it is substantially all solid state, uses much less power than the previous circuits. One embodiment of the present invention could be powered by approximately 500 microwatts while the previous circuit shown in the aforementioned applications used power in the order of several milliwatts.

It is therefore an object of this invention to produce a low power circuit which is capable of being substantially incorporated in an integrated circuit chip and having only one winding on a core external to the chip.

Other objects and advantages of this invention will become apparent from a reading of the specification and appended claims in conjunction with the single drawing which shows a circuit schematic of one embodiment of the present invention.

In the drawing, positive and negative terminals labeled respectively 10 and 12 are shown. A third terminal designated as 14 must be connected to an intermediate point between polarities 10 and 12. However, the reference terminal 14 merely provides a reference voltage intermediate of the voltages supplied by 10 and 12 for a voltage-sensing portion of the circuit. An NPN transistor generally designated as 16 has an emitter connected to terminal 14 and a collector connected through a resistor 18 to terminal 10. A base of transistor 16 is connected through a resistor 20 to terminal 10. This base is also connected through a resistor 20 to terminal 10. This base is also connected through a capacitor 22 to terminal 12. A PNP transistor generally designated as 24 has an emitter connected to terminal 14 while its collector is connected through a capacitor 26 to terminal 12. Two resistors 28 and 30 are connected in series between the collector of transistor 24 and terminal 12. A base of an NPN transistor generally designated as 32 is connected to a junction between the resistors 28 and 30 while an emitter thereof is connected to terminal 12. The collector of transistor 32 is connected through a resistor 34 to a collector of a transistor generally designated as 36 having an emitter connected to terminal 10 and a base connected to the collector of transistor 16. An NPN transistor generally designated as 38 has its base and collector connected respectively to the collector and base of a PNP transistor generally designated as 40. Transistors 38 and 40 together comprise a solid-state controlled switch means. The collector of transistor 32 is connected to the base of transistor 38 and also through a resistor 42 to terminal 12. An emitter of transistor 40 connected through a diode 44 to the base of transistor 16. A further diode 46 is connected from the emitter of transistor 40 to a junction point 48 which is further connected to the base of transistor 24. A resistor 50 is connected between junction point 48 and terminal 12. A winding 52 is connected in parallel with diode 46 and is wound around a saturable magnetic toroid core generally designated as 54. The anode of diode 46 is connected to the cathode of diode 44. A resistor 56 is connected between junction point 48 to a base of a NPN transistor 58 which has its collector connected to terminal 10 and its emitter connected through a resistor 60 to terminal 12. A capacitor 62 connected between the base of transistor 58 and terminal 12. A first output terminal 64 is in common with terminal 12 while a capacitor 66 is connected between the emitter of transistor 58 and a second output terminal 68.

While for simplicity of description all the transistors have been referred to as such, it is to be realized that each of these transistors may be variously termed current-amplifying means, switching means, or voltage-level-sensing means. Further, the diodes are any device which will provide the characteristics of a desirable diode which mainly are unidirectional current flow therethrough. While in most instances the core 54 will be a toroid, there is no necessity that it be limited to a toroid. Further, the resistors and capacitors are all impedance means of various types and may in some instances have substituted therefore other types of impedance means.

OPERATION

In operation the circuit shown in the drawing provides an extremely low-powered, highly sensitive circuit utilizing the singularly wound ferromagnetic core 54. The core is pulsed into saturation in one direction only as outlined in our previously mentioned applications. A solid-state feedback circuit, to be described presently, terminates the pulse upon saturation and allows the core to return to the residual magnetic level for starting a new cycle. The ON time of the pulse will increase or decrease proportionately with changes in the ambient magnetic field. This phenomena is reflected as a width modulation of the core drive pulse. When the signal is integrated, the output is a constant voltage and increases or decreases proportionately with changes in the magnetic field.

When the circuit is turned ON, current will flow through resistor 20 to charge capacitor 22. When the charge in capacitor 22 thereby lowering the reaches a fixed level, transistor 16 will turn ON thereby lowering the voltage at the base of transistor 36 so as to turn this transistor ON and supply an input pulse to transistor 38. As previously mentioned, transistors 38 and 40 constitute a switch which will turn ON and remain ON until it receives a further signal to turn it OFF. This switch acts somewhat similar to an SCR and is in fact constructed much the same way except that an SCR cannot be turned OFF except by starving it or reverse biasing it. When the switch turns ON, current is allowed to flow through resistor 50 and winding 52 of the core as well as through the switch. The capacitor 22 will be discharged through the diode 44 when the two-transistor switch utilizing transistors 38 and 40 is turned ON. The discharge of capacitor 22 thus turns transistor 16 and therefore transistor 36 to an OFF condition. Further, as long as the two-transistor switch is ON, capacitor 22 cannot recharge. Soon, however, the core 54 is driven into saturation and the previously high voltage at junction point 48 decays to a lower voltage due to the lack of impedance to current flow through winding 52. At a current limit point the voltage at the base of transistor 24 becomes lower than the reference voltage 14 and transistor 24 turns ON. The action of transistor 24 turning ON provides a pulse to the base of transistor 32 which in turn places the base of transistor 38 at the same potential as the emitter and thus turns the two-transistor switch to an OFF condition. The RC network comprising resistor 20 and capacitor 22 now recharges to initiate another pulse cycle. Diode 46 effectively nullifies the back EMF resulting when the core returns to the residual level. Thus, the time required to drive the core 54 to saturation may be measured by the ON time of the two-transistor switch. The same information also appears at junction point 48 and is integrated through resistor 56 in combination with capacitor 62 to provide a voltage signal at the base of transistor 58 which is indicative of the magnetic field strength. The transistor 58 along with resistor 60 and capacitor 66 is added to provide an output which will give an indication of sudden changes in the magnetic field. As will be realized by those skilled in the art, since the voltage at junction point 48 is a complex wave which is pulse width modulated, the signal at the base of transistor 58 will be a filtered DC voltage, modulated by any change in core characteristics. Transistor 58 is used to impedance match the signal on capacitor 62 to resistor 60 hence capacitor 66. An output signal appearing between terminals 68 and 64 changes proportionately with low frequency changes in the ambient magnetic field conditions. In other words, there will be a voltage signal across resistor 60 which is modulated or which has superimposed on the surface thereof a small waveform. When there is a low frequency disturbance of the ambient or earth magnetic field, a modulated output will appear as a large change in voltage potential at the output terminals 68 and 64.

One working embodiment of the invention used the following components in the circuit:

| Resistor 18 | 18K  | Capacitor 22 |         | 0.01 µFd    |
|-------------|------|--------------|---------|-------------|
| Resistor 20 | 120K | Capacitor 26 |         | 0.01 µFd    |
| Resistor 28 | 1K   | Capacitor 62 |         | 1 µFd       |
| Resistor 30 | 18K  | Capacitor 66 |         | 12 µFd      |
| Resistor 34 | 1K   |              |         |             |
| Resister 42 | 4.7K | Diode 44     |         | DHD1118 GE  |
| Resister 50 | 2K   | Diodes 46    |         | DHD118 GE   |
| Resistor 56 | 43K  |              |         |             |
| Resistor 60 | 100K |              |         |             |
| Transistor 16 |    | A2068        | Amperex |             |
| Transistor 24 |    | A2200        | Amperex |             |
| Transistor 32 |    | A2068        | Amperex |             |
| Transistor 36 |    | A2200        | Amperex |             |
| Transistor 38 |    | A2068        | Amperex |             |
| Transistor 40 |    | A2200        | Amperex |             |
| Transistor 58 |    | A2068        | Amperex |             |

The core 54 is a supermalloy 1-mil tape-wound core made by Magnetic, Inc. and is designated by core number 52056–1F. The winding 52 on core 54 contains 4,000 turns.

While one specific working embodiment has been shown, I do not wish to be limited by the specification and drawings but only by the scope of the claims wherein I claim:

1. Apparatus for sensing ambient magnetic field strengths comprising, in combination:
    magnetic core means including a sensing winding for saturating only after current is applied through said sensing winding for a sufficient period of time wherein the time is variable depending upon the ambient magnetic field;
    semiconductor-controlled switch means, including output means for providing an output signal and control means for receiving an input signal, said switch means being characterized by remaining ON once an activation signal is received at said control means until a deactivation signal is received for turning said switch means OFF;
    power-supplying means for supplying power across a series combination of said winding and said switch means;
    signal-supplying means for periodically supplying activation signals to said switch means to unidirectionally saturate said core means; and
    semiconductor detection means connected between said winding and said control means for applying a deactivation signal to said switch means when said core saturates, the ON time of said switch means being indicative of external magnetic field strengths.

2. Apparatus as defined in claim 1 wherein said core means is a saturable toroid consisting of one winding.

3. Apparatus as claimed in claim 1 wherein:
    said core means is a saturable toroid including only said sensing winding; and
    the apparatus additionally comprises output circuit means, including integrating means, for providing an output signal indicative of the time elapsing to saturation of said core means.

4. Apparatus as claimed in claim 3 wherein the output means is connected to said sensing winding.

5. Pulse width modulated magnetometer apparatus for measuring ambient magnetic field strengths comprising, in combination:
    saturable magnetic toroidal core means, including only a sensing winding for saturating only after current is applied through said sensing winding for a sufficient period of time wherein the time is variable depending upon the ambient magnetic fields;
    semiconductor-controlled switch means for switching in response to an input signal of the type which is activated or deactivated by different first and second input control signals respectively;
    power-supplying means for supplying power across a series combination of said winding and said switch means;
    RC timing circuit means, connected to said power supplying means, for supplying a variable amplitude output voltage;
    voltage reference;
    first detection circuit means connected to said timing circuit means and to said voltage reference means for supplying an activating first control signal to said switch means when the two voltages are in a predetermined relationship;
    second detection circuit means connected to said winding, for sensing the occurrence of saturation in said core means and for supplying a deactivating second control signal to said switch means; and
    output means for supplying an output signal indicative of the activation time of said switch means, the activation time corresponding to the earth's magnetic field strength at the location of the core means.

6. Apparatus as defined in claim 5 wherein said second detection circuit means is also connected to said voltage references and senses the occurrence of saturation by comparing the voltage at one end of said winding with the voltage reference.

7. Apparatus as claimed in claim 5 wherein the switch means includes control means for receiving an input signal with respect to a common terminal, is activated by a positive signal at said control means with respect to said common terminal and is deactivated by placing both said control means and said common terminal at the same potential.